(12) United States Patent
Kurozumi et al.

(10) Patent No.: US 7,054,388 B2
(45) Date of Patent: May 30, 2006

(54) SIGNAL DETECTION METHOD AND APPARATUS, RELEVANT PROGRAM, AND STORAGE MEDIUM STORING THE PROGRAM

(75) Inventors: Takayuki Kurozumi, Zama (JP); Kunio Kashino, Tokyo (JP); Hiroshi Murase, Atsugi (JP)

(73) Assignee: Nippon Telegraph and Telephone Corporation, Chiyoda-ku (JP)

( * ) Notice: Subject to any disclaimer, the term of this patent is extended or adjusted under 35 U.S.C. 154(b) by 821 days.

(21) Appl. No.: 09/841,080

(22) Filed: Apr. 25, 2001

(65) Prior Publication Data

US 2001/0043659 A1    Nov. 22, 2001

(30) Foreign Application Priority Data

Apr. 27, 2000    (JP)    ............... P2000-128381

(51) Int. Cl.
*H03D 1/00*    (2006.01)

(52) U.S. Cl. .................. 375/340; 375/219; 386/46; 386/69; 704/243; 704/500; 382/181; 382/224; 382/165

(58) Field of Classification Search ............... 375/340, 375/240, 219; 381/41; 704/243, 500; 386/46, 386/69; 382/181, 224, 165
See application file for complete search history.

(56) References Cited

U.S. PATENT DOCUMENTS

| 4,783,802 A | * | 11/1988 | Takebayashi et al. ....... 704/243 |
| 5,852,630 A | * | 12/1998 | Langberg et al. ........... 375/219 |
| 5,918,223 A | | 6/1999 | Blum et al. .................... 707/1 |
| 6,012,027 A | * | 1/2000 | Bossemeyer, Jr. .......... 704/243 |
| 6,243,492 B1 | * | 6/2001 | Kamei ......................... 382/181 |
| 6,373,979 B1 | * | 4/2002 | Wang ........................... 382/165 |
| 6,718,063 B1 | * | 4/2004 | Lennon et al. .............. 382/224 |
| 6,826,350 B1 | * | 11/2004 | Kashino et al. .............. 386/46 |

FOREIGN PATENT DOCUMENTS

JP    06-043892    2/1994

(Continued)

OTHER PUBLICATIONS

T. Kurozumi et al., "Quick Audio Searching for a Query Music Signal Received with Portable Phones", Proceedings of the 2001 IEICE general conference, D-12-57, p. 224, Mar. 26, 2001.

*Primary Examiner*—Chieh M. Fan
*Assistant Examiner*—Eva Zheng
(74) *Attorney, Agent, or Firm*—Thelen Reid & Priest LLP (57) ABSTRACT

Signal detection having superior resistance with respect to feature distortions is realized. Reference and input feature time-series signals, each consisting of feature vectors, are respectively obtained from reference and input time-series signals. The reference and input feature time-series signals are respectively converted into reference and input coded time-series signals, each consisting of codes indicating classifications. A distortion is added to at least one signal of the reference and input time-series signals, the reference and input feature time-series signals, and the reference and input coded time-series signals. The degree of similarity between the reference time-series signal and a collation portion determined in the input coded time-series signal is calculated based on their histograms. The degree of similarity is then compared with a target degree, and such a collating process is repeated while changing the collation portion, thereby determining whether the reference time-series signal is present in the relevant portion.

16 Claims, 5 Drawing Sheets

FOREIGN PATENT DOCUMENTS

| | | |
|---|---|---|
| JP | 06-318256 | 11/1994 |
| JP | 10-294923 | 11/1998 |
| JP | 3065314 | 5/2000 |
| JP | 3065314 | 11/2000 |

* cited by examiner

○ ORIGINAL FEATURE VECTOR
× DISTORTION-ADDED FEATURE VECTOR

VARIANCE

PARALLEL TRANSLATION

SIGNAL DETECTION METHOD AND APPARATUS, RELEVANT PROGRAM, AND STORAGE MEDIUM STORING THE PROGRAM

BACKGROUND OF THE INVENTION

1. Field of the Invention

The present invention relates to a signal detection method and apparatus for searching an input time-series signal (or data) for a portion similar to a reference signal (or data, which is registered in advance), and a relevant program and a storage medium storing the program. The present invention can be applied to picture (or video) signal detection, for example, that is, relates to a technique for searching a video signal of TV broadcasts so as to detect a time when a specific commercial message is broadcast and to perform automatic recording, or a technique for using a specified picture as a reference signal so as to search the contents of TV broadcasts or the Internet for detecting contents which include the same picture. The present invention can be applied not only to picture signals but also to various kinds of signals such as audio signals.

2. Description of the Related Art

An example of a conventional signal detection method is disclosed in Japanese Patent No. 3065314 ("High-speed signal search method, apparatus, and relevant storage medium"). In the disclosed method, an audio signal portion, similar to a reference audio signal which is registered in advance, is detected.

However, the above conventional method assumes that both the reference time-series signal and the input time-series signal have few feature distortions due to noise. Therefore, if there are considerable feature distortions, the search accuracy tends to deteriorate.

SUMMARY OF THE INVENTION

In consideration of the above circumstances, an objective of the present invention is to provide a signal detection method and apparatus, a relevant program, and a storage medium storing the program, for performing a signal detecting operation in consideration of feature distortions, thereby realizing signal detection having superior resistance or tolerance with respect to feature distortions.

Therefore, the present invention provides a signal detection method of searching an input time-series signal for a signal portion similar to a reference time-series signal which is registered in advance and is shorter than the input time-series signal, the method comprising:

a reference feature calculating step of obtaining a reference feature time-series signal from the reference time-series signal, where the reference feature time-series signal consists of feature vectors;

an input feature calculating step of obtaining an input feature time-series signal from the input time-series signal, where the input feature time-series signal consists of feature vectors;

a reference feature coding step of converting the reference feature time-series signal into a reference coded time-series signal consisting of codes which indicate classifications;

an input feature coding step of converting the input feature time-series signal into an input coded time-series signal consisting of codes which indicate classifications;

a distortion adding step of adding a distortion to at least one of the reference time-series signal, the input time-series signal, the reference feature time-series signal, the input feature time-series signal, the reference coded time-series signal, and the input coded time-series signal; and a histogram collating step of determining a collation portion in the input coded time-series signal, generating histograms of both the reference coded time-series signal and the collation portion of the input coded time-series signal, and calculating a degree of similarity between the reference coded time-series signal and the collation portion based on the generated histograms, and wherein the degree of similarity is compared with a predetermined target degree of similarity, and the histogram collating step is repeatedly executed while changing the collation portion in the input coded time-series signal, thereby determining whether the reference time-series signal is present in the relevant portion of the input time-series signal.

According to this method, in comparison with the method disclosed in the above publication of Japanese Patent No. 3065314, the distortion adding step is performed in consideration of feature distortions, so that signal detection having superior resistance or tolerance to feature distortions can be performed.

In the distortion adding step, the following methods are possible:

(i) when the distortion is added to any one of the reference time-series signal and the input time-series signal, a plurality of distortions are added to a signal portion corresponding to each time section of said one of the reference time-series signal and the input time-series signal, (ii) when the distortion is added to any one of the reference feature time-series signal and the input feature time-series signal, a plurality of distortions are added to each feature vector of said one of the reference feature time-series signal and the input feature time-series signal, and (iii) when the distortion is added to any one of the reference coded time-series signal and the input coded time-series signal, a plurality of distortions are added to each code of said one of the reference coded time-series signal and the input coded time-series signal.

The signal detection method may further comprise:

a learning step of calculating, in advance, an amount of distortion used for distorting features in the distortion adding step, and wherein in the distortion adding step, the distortion is added based on the amount of distortion calculated in the learning step.

In this case, the amount of distortion calculated in the learning step may be corrected based on a detected result indicating whether the reference time-series signal is present in the relevant portion of the input time-series signal.

Also in the distortion adding step of the signal detection method, the added distortion may be generated using random numbers.

It is also possible that in the distortion adding step:

an amount of distortion used for distorting features is modeled using a normal distribution, wherein parameters in the modeling are the amount of parallel translation and the variance; and the distortion is added using at least one of the amount of parallel translation and the variance.

The present invention also provides a signal detection apparatus for searching an input time-series signal for a signal portion similar to a reference time-series signal which is registered in advance and is shorter than the input time-series signal, the apparatus comprising:

a reference feature calculating section for obtaining a reference feature time-series signal from the reference time-series signal, where the reference feature time-series signal consists of feature vectors;

an input feature calculating section for obtaining an input feature time-series signal from the input time-series signal, where the input feature time-series signal consists of feature vectors;

a reference feature coding section for converting the reference feature time-series signal into a reference coded time-series signal consisting of codes which indicate classifications;

an input feature coding section for converting the input feature time-series signal into an input coded time-series signal consisting of codes which indicate classifications;

a distortion adding section for adding a distortion to at least one of the reference time-series signal, the input time-series signal, the reference feature time-series signal, the input feature time-series signal, the reference coded time-series signal, and the input coded time-series signal; and a histogram collating section for determining a collation portion in the input coded time-series signal, generating histograms of both the reference coded time-series signal and the collation portion of the input coded time-series signal, and calculating a degree of similarity between the reference coded time-series signal and the collation portion based on the generated histograms, and wherein the histogram collating section determines different collation portions in the input coded time-series signal in turn, calculates the degree of similarity for each collation portion, compares the calculated degree of similarity with a predetermined target degree of similarity, and repeatedly executes the comparison for each determined collation portion, thereby determining whether the reference time-series signal is present in the relevant portion of the input time-series signal.

The distortion adding section may also perform any one of the above-explained methods (i) to (iii).

The signal detection apparatus may further comprise:

a learning section for calculating, in advance, an amount of distortion used for distorting features when adding the distortion, and wherein the distortion adding section adds the distortion based on the amount of distortion calculated by the learning section.

In this case, it is possible that:

feedback of a detected result, determined by the histogram collating section, indicating whether the reference time-series signal is present in the relevant portion of the input time-series signal, is input into the learning section; and the learning section corrects the amount of distortion based on the detected result.

Also in the signal detection apparatus, the distortion adding section may add the distortion by using random numbers.

It is also possible that:

the distortion adding section models an amount of distortion by using a normal distribution, wherein the amount of distortion is used for distorting features, and parameters in the modeling are the amount of parallel translation and the variance; and the distortion adding section adds the distortion using at least one of the amount of parallel translation and the variance.

As a typical example, the input time-series signal and the reference time-series signal are each picture signals. As another typical example, the input time-series signal and the reference time-series signal are each audio signals.

The present invention also provides a program for making a computer execute a signal detecting operation corresponding to the above-explained signal detection method, and a computer readable storage medium storing the program.

According to the present invention, when a signal portion which is similar to the short reference time-series signal (registered in advance) is searched for in a long input time-series signal, signal detection in consideration of feature distortions is performed. Accordingly, the degree of similarity of the target portion can be increased, while the degree of similarity of the other portions can be decreased, thereby preventing a failure in detection or erroneous detection. Consequently, in comparison with conventional signal detection methods, signal detection having superior resistance or tolerance to feature distortions can be performed.

DESCRIPTION OF THE PREFERRED EMBODIMENTS

Figure 1:
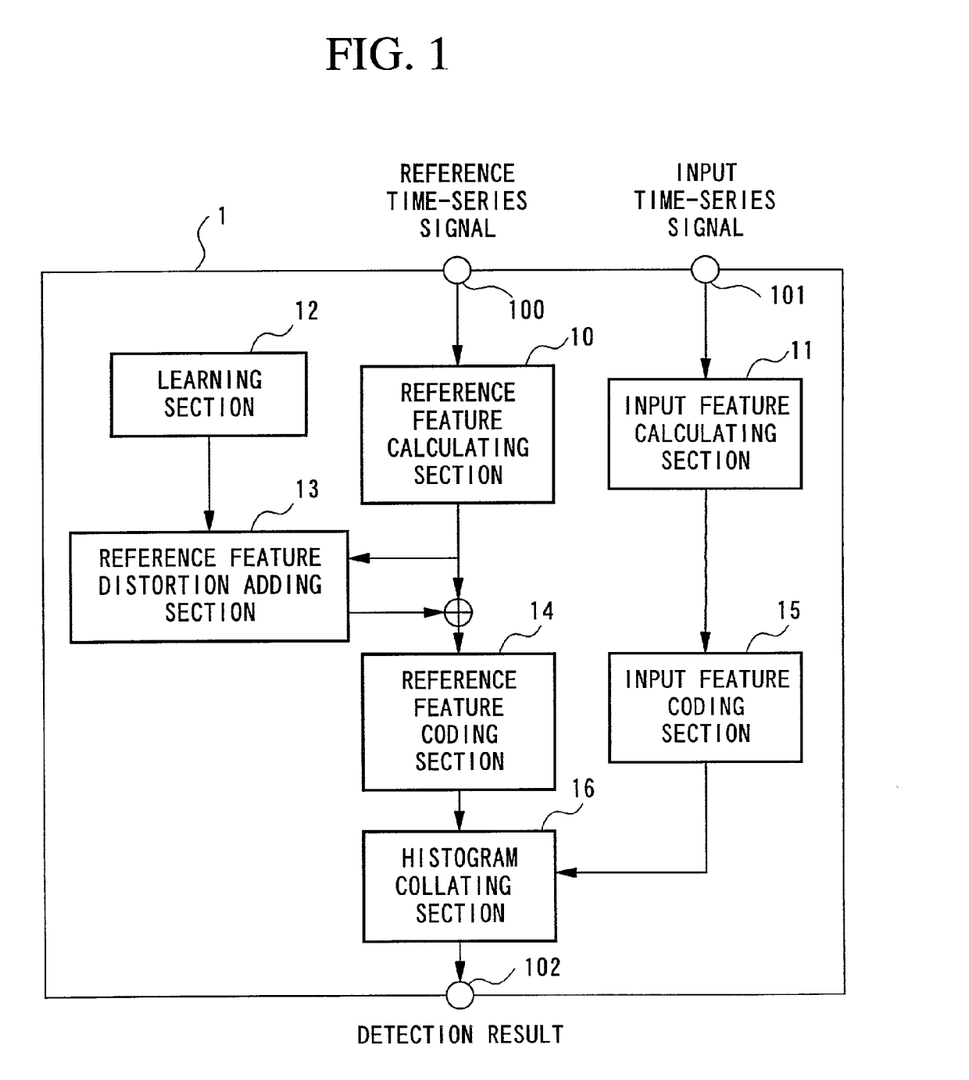
FIG. 1 is a block diagram showing the structure of an embodiment of the signal detection apparatus with respect to picture signals, according to the present invention.

Hereinafter, embodiments according to the present invention will be explained in detail with reference to the drawings. FIG. 1 is a block diagram showing the structure of an embodiment of the signal detection apparatus with respect to picture (or video) signals, according to the present invention.

In FIG. 1, a signal detection apparatus 1 of the present embodiment comprises a reference feature calculating section 10 an input feature calculating section 11, a learning section 12, a reference feature distortion adding section 13, a reference feature coding section 14, an input feature coding section 15, and a histogram collating section 16. In this structure, a reference time-series signal, that is, a picture signal as a query reference signal, and an input time-series signal, that is, a searched picture signal, are input into the signal detection apparatus, and a signal portion (of the input time-series signal), whose degree of similarity with respect to the reference time-series signal is more than a predetermined value θ (called the "search threshold"), is detected.

The reference feature calculating section 10 has a function of performing a reference feature calculating process of obtaining a reference feature time-series signal from a reference time-series signal input from an input terminal 100, where the reference feature time-series signal consists of feature vectors.

The input feature calculating section 11 has a function of performing an input feature calculating process of obtaining an input feature time-series signal from an input time-series signal input from an input terminal 101, where the input feature time-series signal consists of feature vectors.

The learning section 12 has a function of performing a learning process of calculating, in advance, an amount of feature distortion.

The reference feature distortion adding section 13 has a function of performing a distortion adding process of adding a distortion to the reference feature time-series signal consisting of feature vectors.

The reference feature coding section 14 has a function of performing a reference feature coding process of converting the reference feature time-series signal into a reference coded time-series signal consisting of codes which indicate classifications (or classes).

The input feature coding section 15 has a function of performing an input feature coding process of converting the input feature time-series signal into an input coded time-series signal consisting of codes which indicate classifications (or classes).

The histogram collating section 16 has a function of performing a histogram collating process of determining a collation portion in the input coded time-series signal, generating histograms of both the reference coded time-series signal and the collation portion of the input coded time-series signal, and calculating a degree of similarity between the reference coded time-series signal and the collation portion based on the generated histograms. Here, the histogram collating section 16 repeatedly determines a different collation portion in the input coded time-series signal, calculates a degree of similarity between each collation portion and the reference coded time-series signal, and compares the degree of similarity with a predetermined target degree of similarity. This comparison process is repeated for each collation portion (that is, a comparison is performed every time a collation portion is determined), thereby determining whether the reference time-series signal is present in the relevant portion of the input time-series signal.

Each function explained above can be executed by a computer.

Figure 6:
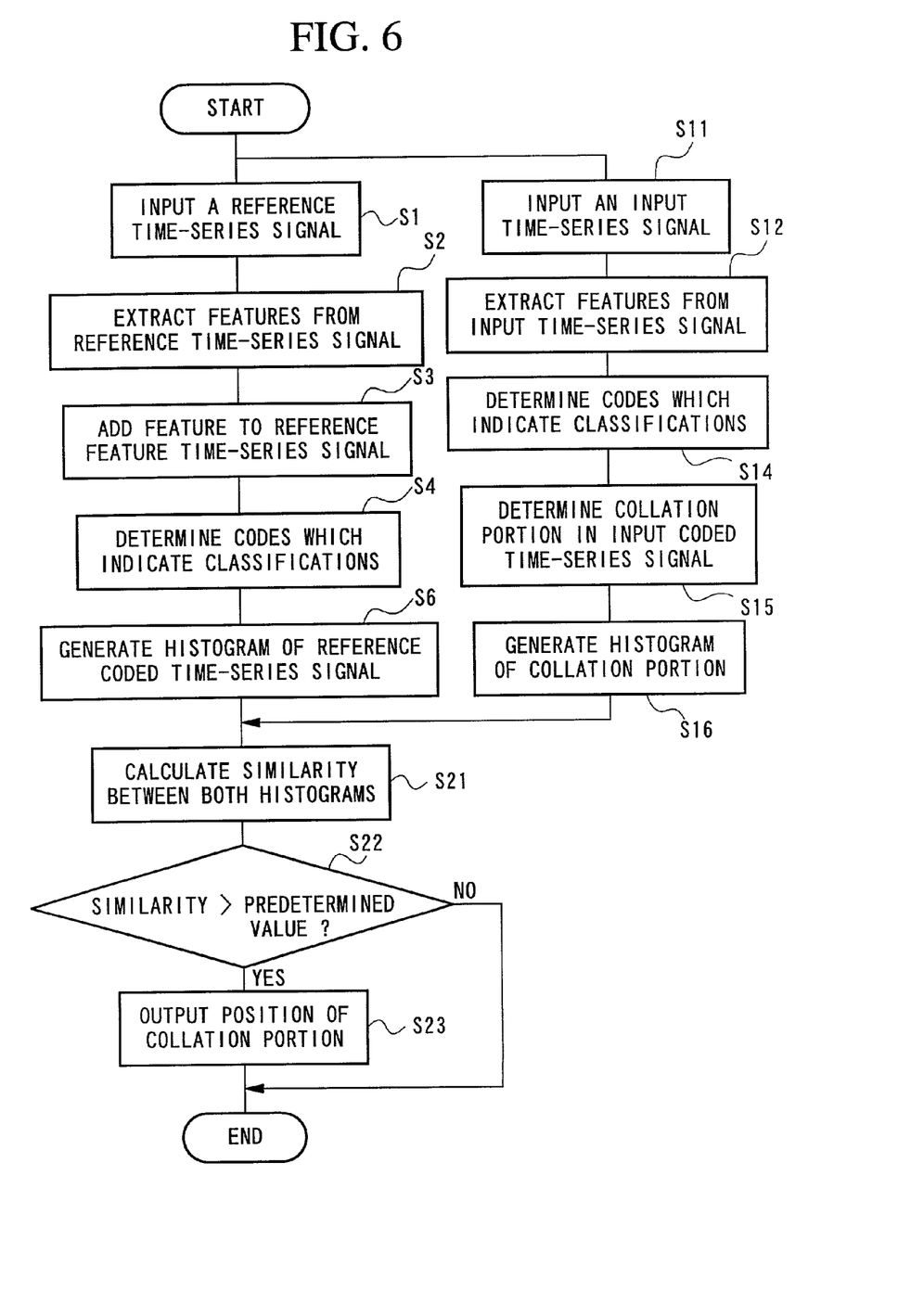
FIG. 6 is a flowchart showing the operation of the signal detection apparatus shown in FIG. 1.

Below, the concrete operation of the signal detection apparatus having the above structure will be explained. FIG. 6 is a flowchart showing the operation of the signal detection apparatus shown in FIG. 1.

First, a reference time-series signal provided via the input terminal 100 is input into the reference feature calculating section 10 (see step S1).

A process of extracting features from the input reference time-series signal is then performed in the reference feature calculating section 10 (see step S2). In the present embodiment, a reduced picture is used as a feature. For example, in order to search a TV broadcast signal to extract an approximately 15-sec picture signal, the following method is effective: a picture frame is equally divided into 4 sections in the horizontal direction and 3 sections in the vertical direction, so that 12 areas are obtained. In each area, the averaged pixel value is calculated for each of R (red), G (green), and B (blue) pixels. Therefore, the 36-dimensional vector consisting of the averaged pixel values with respect to R, G, and B in each divided area is defined as a feature vector. In this case, the feature vector is obtained for each frame.

On the other hand, an input time-series signal provided via the input terminal 101 is input into the input feature calculating section 11 (see step S11). A process of extracting features from the input time-series signal is then performed in the input feature calculating section 11 (see step S12). This process is performed in a way similar to that employed in the reference feature calculating section 10.

A sufficiently long picture signal different from the above-explained reference and input time-series signals is input into the learning section 12.

Then, this long picture signal is input into the signal detection apparatus via a device which may cause a feature distortion. The device which may cause a feature distortion is, for example, a device for dubbing signals, a device for thinning frames, or the like. Apart from this process of inputting the signal via such a device, the above long picture signal is directly input into the signal detection apparatus.

For each frame, the learning section 12 forms a correspondence between the picture signal input via the device which may cause a feature distortion and the directly-input picture signal, so as to generate a picture pair. Based on the picture pair, a probability distribution with respect to distortions from the reference time-series signal to the input time-series signal is obtained. The calculation of the probability distribution can have preferable results if employing a modeling method using a model formed by a normal distribution.

Therefore, a plurality of divided areas are defined in the vector space of the feature vector, and the parameters used in the modeling are the amount of parallel translation (or movement) and the variance. Here, a 6-hour long picture signal is used and 4096 representative vectors are calculated using a known LGB algorithm. The vector space is divided into a plurality of areas, each including nearest points which have the same representative vector.

Figure 2:
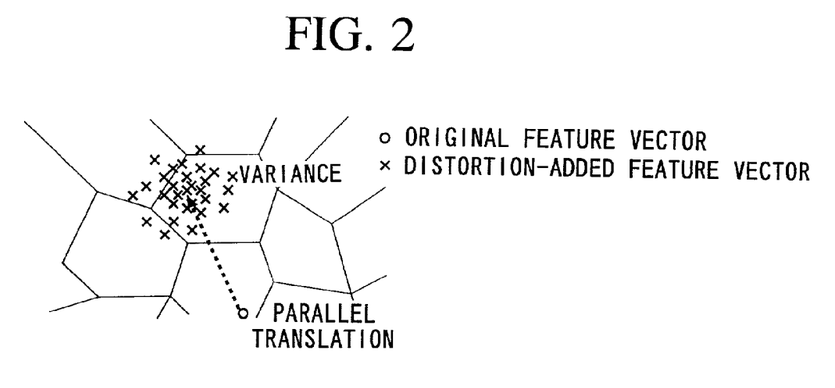
FIG. 2 is a diagram for explaining the functions of the signal detection apparatus.

In the reference feature distortion adding section 13, (normal) random numbers based on a normal distribution (having the above amount of parallel translation and variance) are generated for each feature vector of the reference feature time-series signal obtained by the reference feature calculating section 10, and the random numbers are added to the reference feature time-series signal (refer to FIG. 2 and step S3).

The reference feature time-series signal including added distortions is output from the reference feature distortion adding section 13 to the reference feature coding section 14. Among the above-explained representative vectors, the one closest to each feature vector of the reference feature time-series signal (including the added distortions) is extracted, and the index (number) of the representative vector is defined as a code which indicates a classification (see step S4).

The input feature time-series signal is input into the input feature coding section 15. A process similar to that executed in the reference feature coding section 14 is performed in the input feature coding section 15, so that codes indicating classifications are also obtained (see step S14).

The codes indicating classifications from both the reference feature coding section 14 and the input feature coding section 15 are input into the histogram collating section 16. The histogram collating section 16 calculates a histogram with respect to the reference coded time-series signal (see step S6). That is, the horizontal axis of the histogram shows the codes indicating classifications, while the vertical axis of the histogram shows the frequency of each code. The histogram collating section 16 then determines a collation portion in the input coded time-series signal (see step S15).

More specifically, the histogram collating section 16 determines a collation portion which has the same length as the reference coded time-series signal obtained by the reference feature coding section 14. The histogram collating section 16 then generates a histogram with respect to the collation portion of the input coded time-series signal (see step S16). This histogram is generated using a method similar to that employed for generating the histogram of the reference coded time-series signal. In the next step, the histogram collating section 16 calculates a degree of similarity between the histograms of the reference coded time-series signal and the collation portion of the input coded time-series signal (see step S21). The degree of similarity $S_{RI}$ between the histogram $H_R$ of the reference coded time-series signal and the histogram $H_I$ of the collation portion of the input coded time-series signal is defined as follows:

$$S_{RI} = \frac{1}{D} \sum_{t=1}^{L} \min(h_{RI}, h_{II}) \tag{1}$$

Where L denotes the total number of the bins of the histogram (4096 in the present embodiment), D denotes the total frequency of the histogram (i.e., the total number of the feature vectors obtained from a reference time-series signal), $h_{RI}$, denotes the number of the feature vectors (i.e., frequency) included in the nth bin of the histogram $H_R$, and $h_{II}$ denotes the number of the feature vectors (i.e., frequency) included in the nth bin of the histogram $H_I$.

If the calculated degree of similarity is more than a predetermined value, it indicates that the reference time-series signal is present in the input time-series signal (see step S22). Therefore, the histogram collating section 16 outputs a result of signal detection, that is a signal indicating the position of the current collation portion in the input time-series signal from the output terminal 102 (see step S23).

Based on this output signal, various kinds of control such as automatic picture recording or a search of specific contents can be performed. In addition, a table indicating time and degree of similarity may be shown as matching results on a display (not shown).

Below, an experimental example of the operation of a signal detection apparatus to which the present invention is applied will be explained.

In order to confirm the effects of the present invention, a 10 minute picture signal was used as the input time-series signal, where 200 reference time-series signals (each 15 sec long) were unsystematically selected (i.e., at random). The obtained accuracy was compared with that obtained in a similar search to which the present invention was not applied.

Here, three kinds of input time-series signals were used: the first was directly input into the signal detection apparatus, the second was subjected to a two-times dubbing process using a video tape recorder and then input into the signal detection apparatus, and the third was subjected to a four-times dubbing process using a video tape recorder and then input into the signal detection apparatus. As for the reference time-series signals, a picture signal of a TV program (different from the input time-series signal), directly input into the signal detection apparatus, was used.

For a given controlled search threshold, a conformity rate and a reproduction rate may agree with each other. The factor value resulting when both factors agree was used as a measure of the accuracy in the present example. Here, the conformity rate indicates the rate of correct outputs among all the outputs which are actually output as search results, while the reproduction rate indicates the rate of actual outputs (as search results) among all the outputs which should be output as search results. The conformity rate and the reproduction rate with respect to the present invention depend on the search threshold. In the present example, the search threshold was defined by the following formula:

$$\theta = m + tv \tag{2}$$

where m and v are the average and the standard deviation of the degrees of similarity collected by sampling the input time-series signal for each reference time-series signal and calculating preliminary degrees of similarity, and t is a coefficient empirically chosen. In the above Formula (2), if $\theta>1$, then $\theta$ was set to 1, while if $\theta<0$, then $\theta$ was set to 0. In the present example, t was fixed for 200 repetitions of the operation, and a fixed value of t, which approximately equalized the conformity rate with the reproduction rate, was chosen.

Figure 3:
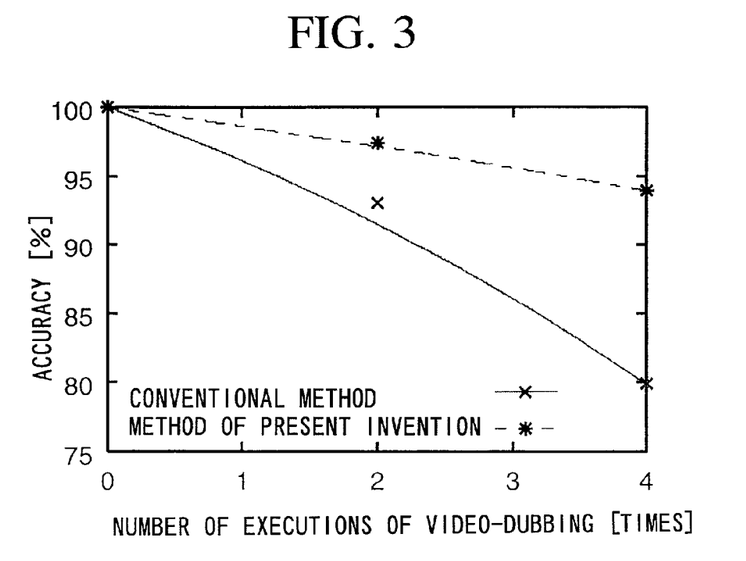
FIG. 3 is a graph comparing the results of the signal search accuracies in the method according to the present invention and a conventional method.

In the results of the present example, the above-defined accuracy was, as shown in FIG. 3, 79.9% according to the conventional method for a signal dubbed four times, while 93.9% according to the present invention for a signal dubbed four times.

Therefore, the signal detection accuracy, that is, the signal search accuracy, can be improved by the signal detection apparatus and method of the present invention.

In the above embodiment, the reference feature distortion adding section 13 adds a distortion to the reference feature time-series signal output from the reference feature calculating section 10; however, the present invention is not limited to this process. For example, a distortion should be added to at least one of the reference time-series signal, the input time-series signal, the reference feature time-series signal, the input feature time-series signal, the reference coded time-series signal, and the input coded time-series signal.

When a distortion is added to any one of the reference time-series signal and the input time-series signal, a plurality of distortions may be added to a signal portion corresponding to each time section of said one of the reference time-series signal and the input time-series signal.

When a distortion is added to any one of the reference feature time-series signal and the input feature time-series signal, a plurality of distortions may be added to a feature vector as explained above.

When a distortion is added to any one of the reference coded time-series signal and the input coded time-series signal, a plurality of distortions may be added to each code of said one of the reference coded time-series signal and the input coded time-series signal.

A program for making a computer execute the above-explained signal detection method may be stored in a computer readable storage medium, and this stored program may be loaded and executed on a computer system, thereby realizing the signal detecting function.

The above computer system includes an operating system (OS) and hardware resources such as peripheral devices and the like.

If the computer system employs a WWW (world wide web) system, the home page providing environment (or display environment) is also included in the computer system.

The above computer readable storage medium may be a portable medium such as a floppy disk, magnetic optical disk, ROM, or CD-ROM, or a storage device built into the computer system, such as a hard disk.

In addition, the computer readable storage medium may be a device for temporarily and dynamically storing the program, such as a communication line through which the program is transmitted via a network (e.g., the Internet) or a telephone line, or a device for temporarily storing the program in such a transmission, such as a server or a volatile memory in the computer system as a client.

The stored program may realize a part of the above-explained functions, or may be provided as a "differential" file (i.e., differential program) which is combined with an existing program which has already been stored in the computer system.

As explained above, according to the signal detection apparatus as an embodiment of the present invention, when a signal portion which is similar to the short reference time-series signal (registered in advance) is searched for in a long input time-series signal, a feature adding section is provided for adding a feature distortion, so that signal detection is performed in consideration of feature distortions. Accordingly, the degree of similarity of the target portion can be increased, while the degree of similarity of the other portions can be decreased, thereby preventing a failure in detection or erroneous detection. Consequently, in comparison with conventional signal detection apparatuses, signal detection having superior resistance or tolerance to feature distortions can be performed.

Figure 4:
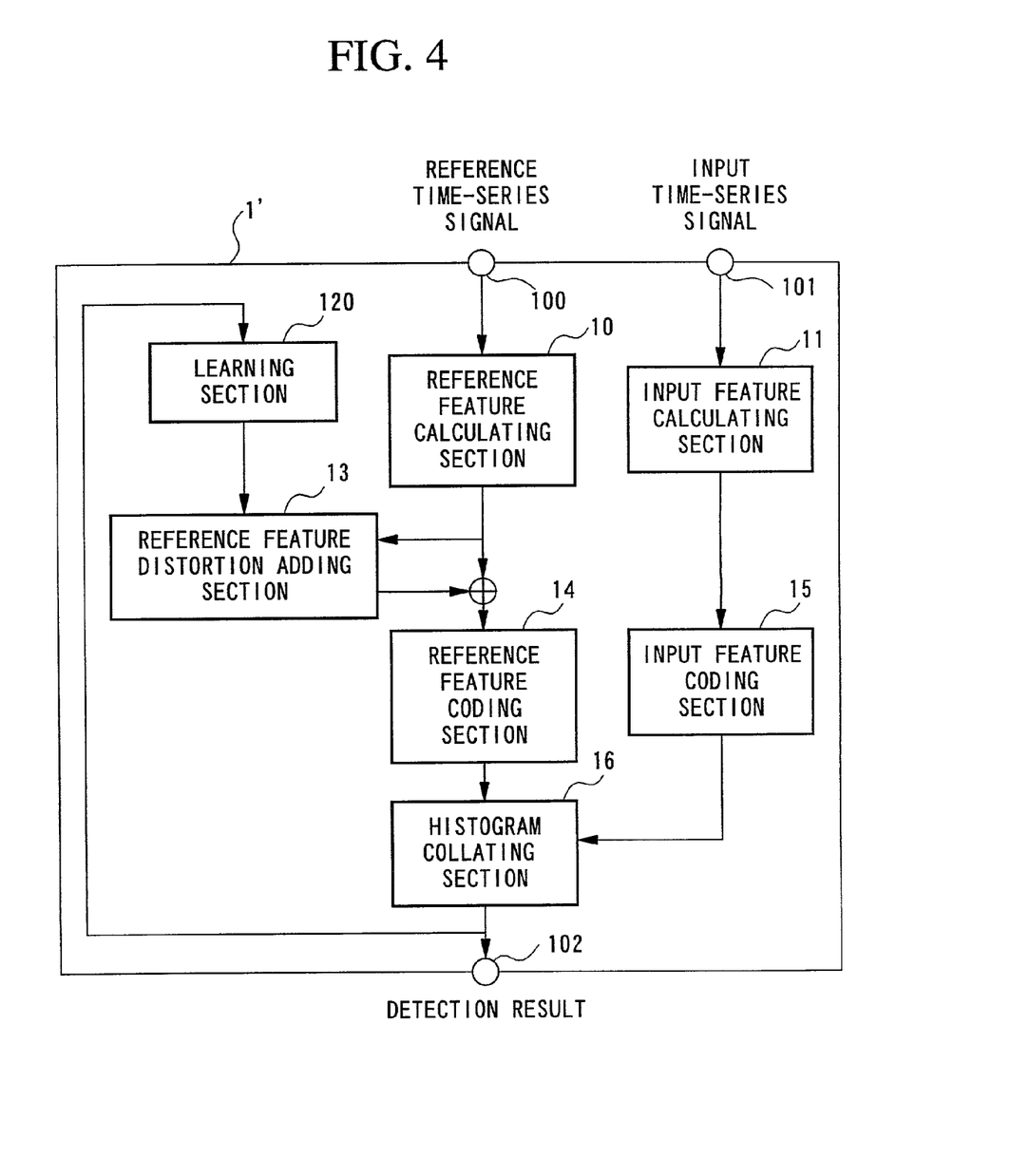
FIG. 4 is a block diagram showing a variation of the signal detection apparatus shown in FIG. 1.

Additionally, as shown in FIG. 4, feedback of a signal indicating a result of signal detection, output from the histogram collating section 16, may be input into the learning section 120 as a feedback signal. In this case, based on the signal indicating a result such as a degree of similarity, the learned feature distortion may be corrected, that is, a relearning process may be performed.

Below, an embodiment applying the present invention to audio (or sound) signal detection will be explained.

Recently, data searching using a portable terminal such as a notebook-sized personal computer, PDA, or cellular phone has become popular, and most of such portable terminals can process not only text data but also audio or picture data. Therefore, the demand for sound or picture searches using portable terminals will certainly increase.

The inventors have examined an audio searching system employing a signal, as a search key, extracted from sounds existing in the surroundings by using a cellular phone (or portable phone). Owing to such a novel data search system, when a user walking on the street hears a musical piece and inputs it into the user's cellular phone, the user can search for information related to the musical piece such as the artist, CDs, concerts, and the like.

However, there are some problems for realizing such a system, for example, (i) it is necessary to search an enormous amount of audio signal data for an input target signal at a high speed, and (ii) the features of the input musical piece may have been distorted due to noise in the surroundings.

The method according to the present invention is effective for solving the above problems.

Figure 5:
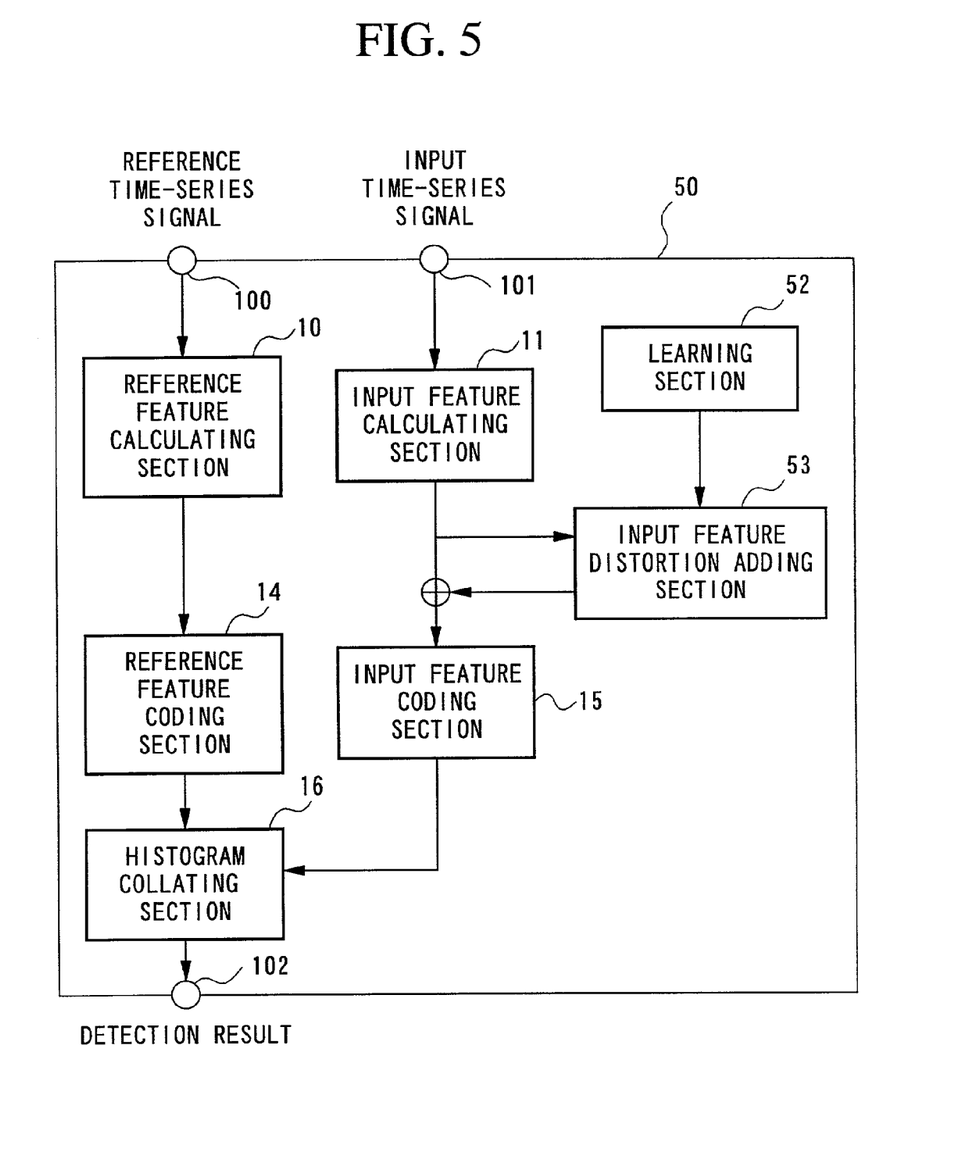
FIG. 5 is a block diagram showing the structure of another embodiment of the signal detection apparatus according to the present invention.

FIG. 5 is a block diagram showing the structure of a signal detection apparatus 50 in the present embodiment.

As an example, 9-minutes of music data recorded on a CD is used as a (long) input time-series signal; this 9-minutes of music data on a CD is input into various kinds of terminals, and a 7.5-sec signal portion is extracted from each input signal, so as to use the extracted signals as (short) reference time-series signal. In this case, the terminal side for outputting each reference time-series signal is a device which may cause a feature distortion. Therefore, as shown in FIG. 5, a learning section 52 and an input feature distortion adding section 53 are provided at the processing side of the input time-series signal.

That is, the learning section 52 has a similar function of performing a learning process of calculating, in advance, an amount of feature distortion, as that of the learning section 12 in FIG. 1, but obtains a probability distribution with respect to distortions from the input time-series signal to the reference time-series signal, by using an audio signal input via a terminal which may cause feature distortions and an audio signal directly input into the signal detection apparatus (both audio signals are provided for learning use). Here, frequency spectra obtained using a band-pass filter are used as feature vectors.

The input feature distortion adding section 53 performs a distortion adding process for each feature vector of the input feature time-series signal obtained by the input feature calculating section 11.

As explained above, the signal detection apparatus and method according to the present invention can be effectively applied to various signals by providing a distortion adding section at a suitable position.

What is claimed is:

1. A signal detection method of searching an input time-series signal for a signal portion similar to a reference time-series signal which is registered in advance and is shorter than the input time-series signal, the method comprising:
   a reference feature calculating step of obtaining a reference feature time-series signal from the reference time-series signal, where the reference feature time-series signal consists of feature vectors;
   an input feature calculating step of obtaining an input feature time-series signal from the input time-series signal, where the input feature time-series signal consists of feature vectors;
   a reference feature coding step of converting the reference feature time-series signal into a reference coded time-series signal consisting of codes which indicate classifications;
   an input feature coding step of converting the input feature time-series signal into an input coded time-series signal consisting of codes which indicate classifications;
   a distortion adding step of adding a distortion to at least one of the reference time-series signal, the input time-series signal, the reference feature time-series signal, the input feature time-series signal, the reference coded time-series signal, and the input coded time-series signal;
   histogram collating step of determining a collation portion in the input coded time-series signal, generating histograms of both the reference coded time-series signal and the collation portion of the input coded time-series signal, and calculating a degree of similarity between the reference coded time-series signal and the collation portion based on the generated histograms;
   wherein the degree of similarity is compared with a predetermined target degree of similarity, and the histogram collating step is repeatedly executed while changing the collation portion in the input coded time-series signal, thereby determining whether the reference time-series signal is present in the relevant portion of the input time-series signal; and
   in the distortion adding step:
      the added distortion is generated using random numbers;

an amount of distortion used for distorting features is modeled using a normal distribution, wherein parameters in the modeling are the amount of parallel translation and the variance; and the distortion is added using at least one of the amount of parallel translation and the variance.

2. A signal detection method as claimed in claim 1, wherein when the distortion is added to any one of the reference feature time-series signal and the input feature time-series signal in the distortion adding step, a plurality of distortions are added to each feature vector of said one of the reference feature time-series signal and the input feature time-series signal.

3. A signal detection method as claimed in claim 1, wherein when the distortion is added to any one of the reference coded time-series signal and the input coded time-series signal in the distortion adding step, a plurality of distortions are added to each code of said one of the reference coded time-series signal and the input coded time-series signal.

4. A signal detection method as claimed in claim 1, further comprising:

a learning step of calculating, in advance, an amount of distortion used for distorting features in the distortion adding step, and wherein in the distortion adding step, the distortion is added based on the amount of distortion calculated in the learning step.

5. A signal detection method as claimed in claim 4, wherein the amount of distortion calculated in the learning step is corrected based on a detected result indicating whether the reference time-series signal is present in the relevant portion of the input time-series signal.

6. A signal detection method as claimed in claim 4, wherein in the distortion adding step:

an amount of distortion used for distorting features is modeled using a normal distribution, wherein parameters in the modeling are the amount of parallel translation and the variance; and the distortion is added using at least one of the amount of parallel translation and the variance.

7. A signal detection method as claimed in claim 1, wherein the input time-series signal and the reference time-series signal are each picture signals.

8. A signal detection method as claimed in claim 1, wherein the input time-series signal and the reference time-series signal are each audio signals.

9. A signal detection apparatus for searching an input time-series signal for a signal portion similar to a reference time-series signal which is registered in advance and is shorter than the input time-series signal, the apparatus comprising:

a reference feature calculating section for obtaining a reference feature time-series signal from the reference time-series signal, where the reference feature time-series signal consists of feature vectors;

an input feature calculating section for obtaining an input feature time-series signal from the input time-series signal, where the input feature time-series signal consists of feature vectors;

a reference feature coding section for converting the reference feature time-series signal into a reference coded time-senes signal consisting of codes which indicate classifications;

an input feature coding section for converting the input feature time-series signal into an input coded time-series signal consisting of codes which indicate classifications;

a distortion adding section for adding a distortion to at least one of the reference time-series signal, the input time-series signal, the reference feature time-series signal, the input feature time-series signal, the reference coded time-series signal, and the input coded time-series signal;

a histogram collating section for determining a collation portion in the input coded time-senes signal, generating histograms of both the reference coded time-series signal and the collation portion of the input coded time-series signal, and calculating a degree of similarity between the reference coded time-series signal and the collation portion based on the generated histograms;

wherein the histogram collating section determines different collation portions in the input coded time-series signal in turn, calculates the degree of similarity for each collation portion, compares the calculated degree of similarity with a predetermined target degree of similarity, and repeatedly executes the comparison for each determined collation portion, thereby determining whether the reference time-series signal is present in the relevant portion of the input time-series signal;

the distortion adding section adds the distortion by using random numbers;

the distortion adding section models an amount of distortion by using a normal distribution, wherein the amount of distortion is used for distorting features, and parameters in the modeling are the amount of parallel translation and the variance; and the distortion adding section adds the distortion using at least one of the amount of parallel translation and the variance.

10. A signal detection apparatus as claimed in claim 9, wherein when the distortion is added to any one of the reference feature time-series signal and the input feature time-series signal, the distortion adding section adds a plurality of distortions to each feature vector of said one of the reference feature time-series signal and the input feature time-series signal.

11. A signal detection apparatus as claimed in claim 9, wherein when the distortion is added to any one of the reference coded time-series signal and the input coded time-senes signal, the distortion adding section adds a plurality of distortions to each code of said one of the reference coded time-series signal and the input coded time-series signal.

12. A signal detection apparatus as claimed in claim 9, further comprising:

a learning section for calculating, in advance, an amount of distortion used for distorting features when adding the distortion, and wherein the distortion adding section adds the distortion based on the amount of distortion calculated by the learning section.

13. A signal detection apparatus as claimed in claim 12, wherein:

feedback of a detected result, determined by the histogram collating section, indicating whether the reference time-series signal is present in the relevant portion of the input time-series signal, is input into the learning section; and the learning section corrects the amount of distortion based on the detected result.

14. A signal detection apparatus as claimed in claim 12, wherein:

the distortion adding section models an amount of distortion by using a normal distribution, wherein the amount of distortion is used for distorting features, and parameters in the modeling are the amount of parallel translation and the variance; and the distortion adding section adds the distortion using at least one of the amount of parallel translation and the variance.

15. A signal detection apparatus as claimed in claim 9, wherein the input time-series signal and the reference time-series signal are each picture signals.

16. A signal detection apparatus as claimed in claim 9, wherein the input time-series signal and the reference time-series signal are each audio signals.

* * * * *